C. E. BERTELS.
COMPOUND ADJUSTABLE GEAR WHEEL.
APPLICATION FILED MAY 8, 1920.

1,354,717. Patented Oct. 5, 1920.

Inventor
C. E. Bertels
By Watson E. Coleman
Attorney

UNITED STATES PATENT OFFICE.

CHARLES E. BERTELS, OF TRUCKSVILLE, PENNSYLVANIA.

COMPOUND ADJUSTABLE GEAR-WHEEL.

1,354,717.

Specification of Letters Patent.

Patented Oct. 5, 1920.

Application filed May 3, 1920. Serial No. 379,934.

*To all whom it may concern:*

Be it known that I, CHARLES E. BERTELS, a citizen of the United States, residing at Trucksville, in the county of Luzerne and State of Pennsylvania, have invented certain new and useful Improvements in Compound Adjustable Gear-Wheels, of which the following is a specification, reference being had to the accompanying drawings.

This invention relates to gear wheels such as are used in spur gearing, worm gearing, and other gearing which is particularly adapted to use in precision machines, milling machines, gear cutting machines, etc., and particularly where there is a long train of gears.

The general object of the invention is to provide a gear wheel of this character which is formed of a plurality of separate sections or subordinate wheels, as they may be termed, which may be adjusted to stagger the teeth to any desired position to eliminate all possibility of backlash and to secure an increase in tooth contact over the tooth contact found in ordinary gearing, which increase of tooth contact will increase the smoothness of action.

A further object is to provide a gear wheel of this character so arranged that it will be practically noiseless, and in which the gear wheel will be formed to provide a plurality of pockets which, if the gear runs in oil, will hold the oil and form dash pots, as it were, for the cushioning of intermeshing gear teeth.

A further object is to provide means whereby the gear disks may be readily adjusted by hand with any desired relation to each other.

A further object is to provide a gear of this character in which any single gear disk may be set to take up backlash, leaving the balance of the gear disks and the main gear wheel to take up the load.

Other objects will appear in the course of the following description.

My invention is illustrated in the accompanying drawings, wherein:—

Figure 1:
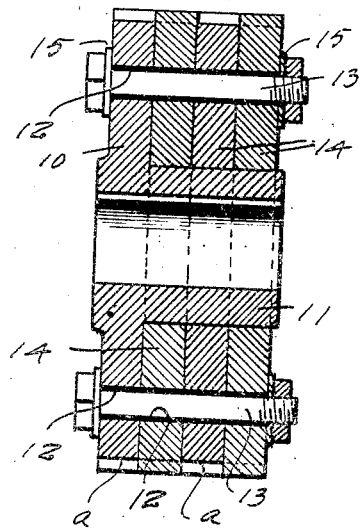
Figure 1 is a diametrical sectional view of a gear wheel constructed in accordance with my invention.
Figure 2:
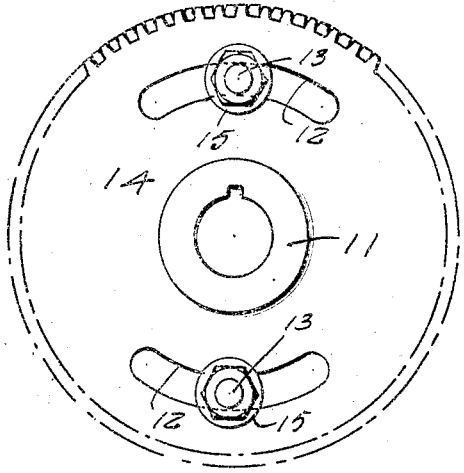
Fig. 2 is a face view of the gear wheel shown in Fig. 1.

By reference to these drawings, it will be seen that my improved gear wheel comprises a gear wheel 10 having a relatively long hub 11 of any desired length, which hub is interiorly grooved for engagement with a feather or key. This disk or gear wheel section 10 is arcuately slotted at one or more points, as at 12, for the passage of attaching bolts 13. Adapted to be disposed upon the hub 11 are a plurality of gear wheels or gear disks, designated 14. These may be all alike and are slipped upon the hub and then clamped in place to the disk 10 by means of the bolts 13. These bolts 13 may pass entirely through all the disks of the series, including the disk 10, or the bolts may be stud bolts engaging the screw-threaded openings in the disk 10. I do not wish to be limited to this detail. Washers 15 are disposed between the heads of the bolts and the adjacent disk.

Figure 3:
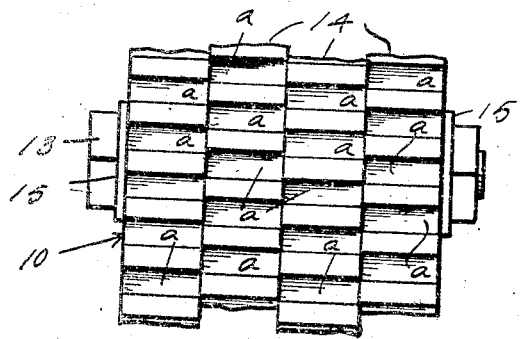
Fig. 3 is an enlarged elevation of the periphery of the gear wheel shown in Fig. 1.
Figure 4:
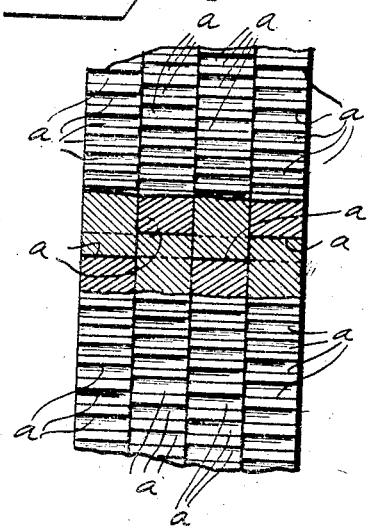
Fig. 4 is an enlarged elevation partly in section of the intermeshing portions of two gear wheels.

I have illustrated all of the disks 14 and the disks 10 as of the same width and with teeth of the same pitch, but it will also be understood that the teeth of the several disks may be cut on a bevel so that when used on milling or hobbing machines in precision tool work, or for timing gears, extreme accuracy and steadiness of movement can be secured and smooth running and continuous contact obtained. Preferably, I arrange the disks as illustrated in Fig. 3, so that the teeth on one disk are alternately disposed or in staggered relation to the teeth on adjacent disks, thereby forming a series of pockets *a*, each pocket being defined by the adjacent teeth on the same disk and the ends of the pockets being closed by the teeth on the next adjacent disks. These pockets, when running in oil, form dash pots, as it were. In other words, the oil collects in these pockets and cushions the teeth of the meshing gear wheel entering these pockets. This reduces wear and eliminates noise at high speed, making this form of gearing particularly adapted to timing gears for automobiles and doing away with the necessity of using "silent chains," as they are known, or helical gears, which are objectionable as they produce great friction and end thrust. It will be understood that in this compound gear wheel any single gear disk may be set to take up backlash, leaving the balance of the gear disks and the main gear disk to take up the load.

It will be seen that the adjustment of the gear disks is very simple, in that the adjustment is made by hand, thus making the adjustment inexpensive.

While, as before stated, I have illustrated the gear as being formed of gear disks each having the same style of tooth and the same tooth pitch, yet I do not wish to be limited to this, as the disks do not have to have the same style of tooth or the same tooth pitch. Each disk could have any desired style of tooth or any tooth pitch so long as its mate on the intermeshing gear corresponds, and it is obvious that the disks may have any desired width and that the width may vary for different disks. In other words, a compound gear wheel made up of a series of disks might be formed of a plurality of disks having a different style of gear teeth on any one disk from the gear teeth on an adjacent disk.

I claim:—

1. A compound gear wheel comprising a peripherally toothed main disk having a laterally projecting hub, a plurality of annular peripherally toothed disks fitting upon said hub, and means engaging the annular disks with each other and the first named disk and holding said annular disks from movement relative to each other and the first named disk.

2. A compound gear wheel comprising a peripherally toothed disk having a hub, a plurality of annular, peripherally toothed disks fitting upon said hub and adjustable therearound, and means engaging the adjustable disks with each other and the first named disk and acting to hold the disks in adjusted relation.

3. A compound gear wheel comprising a peripherally toothed disk having a central hub extending laterally from the disk and a series of annular, peripherally toothed disks mounted on said hub and rotative therearound, all of the disks having the same diameter, the rotative disks being arcuately slotted, and bolts passing through the first named disk of the series and through said slots and holding the disks in adjusted relation to each other.

4. A compound gear wheel comprising a peripherally toothed disk having a central hub extending laterally from the disk and a series of annular, peripherally toothed disks mounted on the hub and rotative therearound, the relatively rotating disks being arcuately slotted, and bolts passing through the first named disk, and means engaging the rotative disks with the first named disk of the series and passing through said slots, said means holding the disks in adjusted relation to each other.

In testimony whereof I hereunto affix my signature.

CHARLES E. BERTELS.